United States Patent
Goodfellow

(10) Patent No.: US 6,282,593 B1
(45) Date of Patent: Aug. 28, 2001

(54) EXTENSION OF ELECTRONIC BUSES AND THEIR BUS PROTOCOLS USING SIGNAL-PROPAGATION TIMING COMPENSATION

(76) Inventor: Tony Goodfellow, 6662 Gatehill Cir., Huntington Beach, CA (US) 92648-2109

( * ) Notice: Subject to any disclaimer, the term of this patent is extended or adjusted under 35 U.S.C. 154(b) by 0 days.

(21) Appl. No.: 09/075,450

(22) Filed: May 8, 1998

(51) Int. Cl.$^7$ .................................................. G06F 13/00
(52) U.S. Cl. ...................... 710/101; 710/105; 710/106; 710/2; 710/20; 710/58; 370/508; 370/519
(58) Field of Search .................................. 710/2, 20, 21, 710/58, 59, 60, 61, 101, 105, 106; 370/508, 519

(56) References Cited

U.S. PATENT DOCUMENTS

| | | | | |
|---|---|---|---|---|
| 4,831,358 | * | 5/1989 | Ferrio et al. | 340/825.5 |
| 4,831,516 | * | 5/1989 | Tanaka et al. | 708/100 |
| 5,325,491 | * | 6/1994 | Fasig | 710/101 |
| 6,115,771 | * | 9/2000 | Born | 710/129 |

* cited by examiner

Primary Examiner—Rupal Dharia
(74) Attorney, Agent, or Firm—Stradling, Yocca, Carlson & Rauth

(57) ABSTRACT

A method using a Reflective Timing Signal to automatically adjust the timing parameters of an asynchronous bus to compensate for its physical extension.

1 Claim, 9 Drawing Sheets

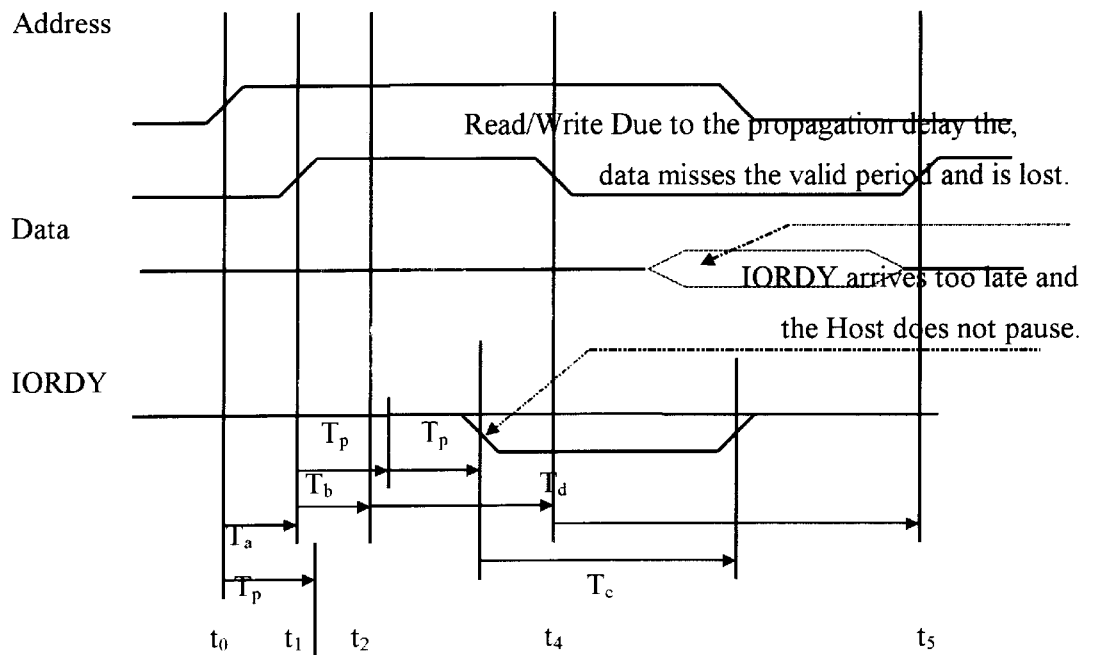
Figure 5a - ATA PIO Protocol At the Host (Extended Cable)
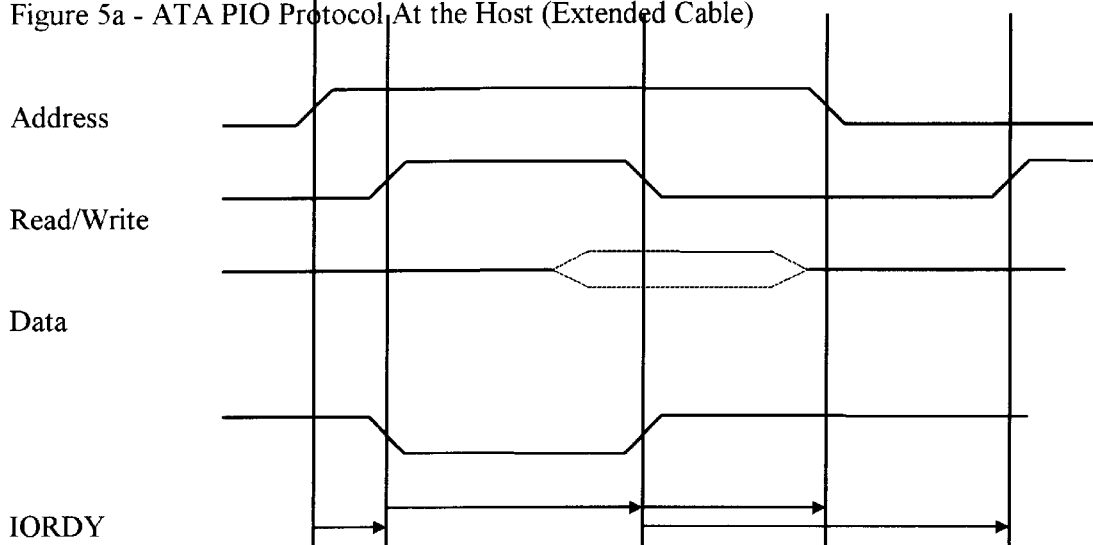
Figure 5b - ATA PIO Protocol At the Device (Extended Cable)

EXTENSION OF ELECTRONIC BUSES AND THEIR BUS PROTOCOLS USING SIGNAL-PROPAGATION TIMING COMPENSATION

BACKGROUND—FIELD OF THE INVENTION

The invention relates to the connection of devices to electronic asynchronous bus architectures. In particular to the connection of data storage and other devices to asynchronous computer buses.

BACKGROUND—DESCRIPTION OF PRIOR ART

Figure 1:
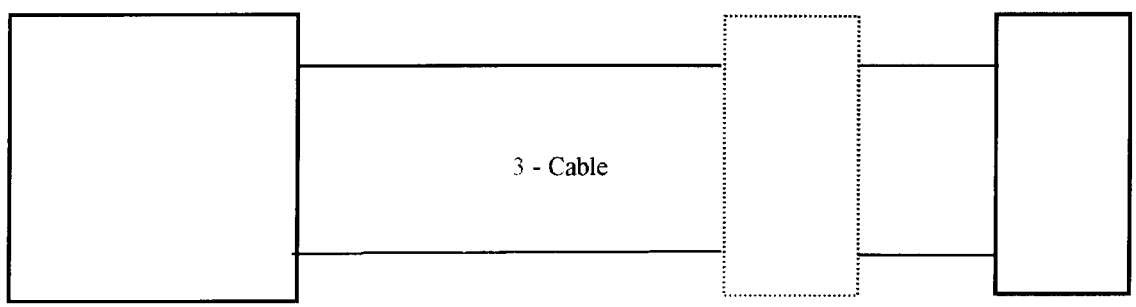
FIG. 1—Standard Implementation
1—Host—This is the conventional ATA Host interface system (electronics and programming interface).
2—Device—This is a conventional ATA Device.
3—Cable—The cable connecting the Device to the Host, subject to the maximum length imposed by the standard.
4—Optional Second Device—A second Device is attached at an intermediate connector between the Host and the Device. The overall length of the cable does not change.

The number of devices that can be attached to a computer continually grows. The user of a computer may wish to add these devices but finds that the computer has no physical space left to in which to house them. In some cases the user would like to locate some devices in a more convenient location than the main computer. For example, an office user may wish a large computer to be placed out of way but would like exchangeable devices like diskette drives and CD-ROMS to be handily placed on the desk top. These types of needs can be satisfied by physically extending the bus to which the devices are attached.

It is common for data to be passed between different electronic devices using some type of data highway or bus. In many cases, the bus can be a physical cable that allows the devices to be some distance apart. For data to be transferred, a series of electrical or optical signals are passed along the bus to and from the devices. The sequence of these signals is termed a protocol. The protocol can be considered as a series of steps that the sending and receiving devices have to follow to ensure that the data arrives without corruption.

There are a number of signaling protocols commonly in use. They are usually based on the handshake method (synchronous), the reliance on events happening at preset intervals (asynchronous) or a combination of both.

Synchronous protocols rely on an exchange of permissions between the sender and the receiver, known as a handshake. The handshake method usually requires the sender to ask the receiver if it is ready to receive the data. The sender waits for permission from the receiver before sending the data. The data can be sent a single element at a time or as a burst of data. If the data is sent in a burst, the rate of transmission is controlled by a series of clock pulses. These pulses can either be on a separate signaling wire or embedded in the data. In some instances, there is a procedure for the sender and the receiver to check the integrity of the data and to re-send it if needed. Although this method has a high level of data integrity, the extra checking can imposes an overhead that reduces the overall data throughput.

Asynchronous protocols rely on events happening within specified times. This means that the sender sends the signals to the receiver and expects the signals to be received within an absolute time period or time window. There is no indigenous method of checking if the data was received correctly. If the signals miss that window, they are lost unless some higher level of protocol is used to send an acknowledgment. In most cases, asynchronous protocols are used on short internal buses, such as back-planes or computer motherboards. These types of buses have their electrical, timing and physical characteristics well defined, and employing them assures that the data signals will arrive within the time windows specified. Consequently, they do not have to carry the overhead of a handshaking protocol. Some asynchronous protocols have a method for the receiver to signal to the sender to slow or pause the transfer. In many cases, the receiver has to signal a pause within a specified time; otherwise, the sender assumes that it is permitted to send the data.

The combination protocols use asynchronous methods to control the transfer and synchronous methods to transfer actual data. For the purposes of this patent application, this type of protocol will be termed pseudo-synchronous.

Asynchronous protocols are intended for short internal buses where the distances and electrical characteristics are well controlled. These buses are often not electrically terminated and are subject to electrical noise induced by reflected signals, a problem know as ringing which can be contained over short bus lengths. When it is required to physically extend these buses, line drivers and receivers are often needed as well as electrical termination of the bus to eliminate or reduce ringing. These well known techniques impose delays in the transmission of the signals as well as the time for the signal to travel along the extra length of cable giving an overall signal propagation delay.

Unfortunately, asynchronous or pseudo-synchronous bus protocols have elements in them that are time critical which means that certain signal transitions must happen within a set time window. The propagation delay imposed by extending the length of the bus means that the signal transitions can be delayed sufficiently to miss this window. These protocols are timed or controlled from a Host at one end of the bus even if data is being transmitted from a Device at the other end of the bus. The protocols used involve the Device sending data to the Host in response to a request from the Host. The Host expects that response in a certain time window, if response is delayed due to extra propagation delays then the response is lost. This makes it impractical to physically extend these buses.

Although not exactly the same situation, U.S. Pat. No. 5,325,491 to Fasig (1994) describes a method of extending an internal computer bus so that more devices can be added by passing the bus through a cable to an external chassis. The patent describes conventional signal termination techniques and a method to extend the period of the asynchronous protocol. The method described uses a delay-line and state machine logic to change the sequence of events of the protocol. This scheme requires the knowledge of the delays in all elements of the system. Any change in a component or length of connection requires that the delay-line is changed to match the characteristics of the new configuration. In circumstances where both ends of the extended bus and the length of the connection are controlled, this would be a viable solution. However, it is desirable to allow the user to connect devices from a plethora of device manufactures to a plethora of host systems from different manufacturers using lengths of cable to suit the needs of the user. The method described in the prior art would require the user to have an intimate knowledge of the different timing elements that were being connected together and a method for the user to change the delay-line to match those requirements. Because of this, the method is impractical to use except for those users who are technically proficient in this field of work.

This Invention

There are two problems to solve when extending the asynchronous or pseudo-synchronous buses: one is the electrical noise and signal degradation, the other is the absolute timings of the asynchronous elements of the protocol.

Signal Buffering

By using suitable electrical line drivers, buffers and terminating networks, the electrical problems can be solved. These are well understood techniques used within the computer and telecommunications industries and need not be described here. For the purposes of this application, the combination of these techniques is termed signal buffering. The very implementation of signal buffering induces extra delay into the time taken to transmit the data, thereby increasing the problems due to timing. For the purposes of this application it is assumed that the physical bus connecting the Device to the Host is properly terminated.

Reflective Timing

The timing problem is due to the Host expecting a response from the Device within a set period of time. The solution is to automatically stretch the period that the Host expects to receive the response from the Device by a period that is proportional to the extra delay imposed by the cable and the signal buffering.

One method to accomplish this timing compensation is to add two signals to the cable: a pair referred to as the reflective timing pair. One of these signals might be termed the Reflective Timing Out (RTO) and the other the Reflective Timing In (RTI). The path these signals take is as identical, as practical, to the path that the data and control signals take. This means that they would go through electronics that had the equivalent timing effects as the signal buffers. For all practical purposes the RTO signal will arrive at the receiver at the same time as the other signals on the bus.

For this scheme to function, the sender transmits a RTO signal simultaneously with the transmission of control and/or data signals. The RTO signal will arrive at the receiver at the same time as the control/data signals. The receiver instantly reflects the RTO signal onto RTI, the signal then travels back to the sender. The time interval between the sender's transmitting the RTO signal and its arrival back at the sender as the RTI signal is termed the reflective time. The reflective time is equal to the round-trip propagation delay due to the buffers and the cable. The sender can use this timing information to modify the time windows for which the signal sequences are valid can use this timing information.

There are many different ways that the reflective time can be used. In some instances, it can be measured and then various pulses modified to accommodate the effects of the propagation delays. In other instances, it can be logically combined with other signals to pause a sender or to stretch clock pulses. In all methods, the timing adjustment is entirely automatic making the interface interoperable between devices and manufacturers and needs no expertise on behalf of the user of the extended bus.

Implementation Example

A common example of an internal bus extended onto a cable is one often used to attach ATA (also known as IDE) peripheral devices in the computer and allied industries. The name derives from the interface standard used by the device to connect to the computer system. The ATA standard is recognized on an industry-wide basis and is administered under the auspices of the American National Standards Institute (ANSI). By following this standard, computer users can obtain devices from a variety of manufacturers and know that they will inter-operate.

The ATA interface connects a Host system to a Device, using a cable. The ATA Interface uses all three types of protocols (asynchronous, synchronous and pseudo-synchronous), depending on the capabilities of the Host and Devices connected in any particular configuration. The types of Devices currently using the ATA interface include disk drives, CD-ROM drives, DVD drives, tape drives and exchangeable media drives. Although the current use is for data storage devices, the interface does not preclude other types of devices being attached.

Due to the problems already described, the current specification for the ATA interface limits the length of the ATA cable to 18 inches. In many applications, it is desirable to locate the Devices more than 18 inches from the Host. In such applications, ATA interface devices cannot be used. The current solution is to employ devices using other protocols, but these devices are usually considerably higher in cost than their ATA interfaced equivalents.

FIG. 1 illustrates the connection between a Host and Devices on an ATA bus.

The ATA interface is defined to be between a Host and one or two Devices. The Host is always in control of the transmission of data to or from the Devices.

The ATA interface consists of two main elements: the signals transmitted along a cable and the protocol used to deliver those signals. There are three sets of protocols involved, known as PIO, DMA and Ultra-DMA.

The PIO protocol is purely asynchronous.

The DMA protocol uses an asynchronous method to initiate and terminate the transfer. The data portion of the protocol is synchronous when sending signals from the Host to the Device but has an absolute time for the device to signal a request to pause the Host. For data sent from the Device to the Host, the Host sends a clock signal that the Device has to respond to within an absolute time. Consequently, it is considered pseudo-synchronous.

The Ultra-DMA protocol also uses the asynchronous protocol to initiate and terminate the transfer. The data portion uses a clock generated by the sender (the Host or Device), and is thus a synchronous protocol.

ATA—Asynchronous

As explained above, an asynchronous protocol is always used to initiate and to terminate a transfer, even if it is not used to transfer the bulk of the data. The control of this protocol is always from the Host, with the Device responding within set time periods. The Device does, however, have the ability to pause the Host.

The Host and Devices are connected via a cable containing a number of separate conductors, each conductor being given a signal name. All transfers to or from an ATA device are to or from its registers. These registers are addressed by a number of signals. By asserting a combination of these signals, the Host can indicate which register is being accessed. The direction of the data flow is indicated by two signals, one for read from the Device and the other for writing to the device. The data is sent using a set of signal lines known as the data signals. The Device can cause the Host to pause; using a signal called IORDY.

Figure 2:
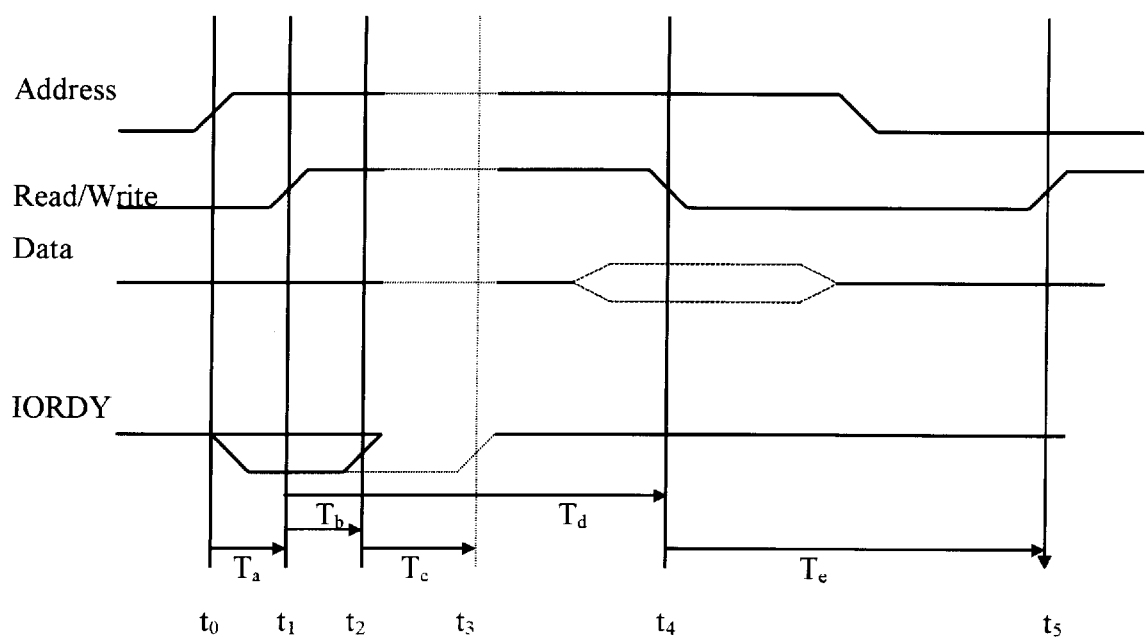
FIG. 2—Standard ATA PIO Protocol Timings
FIG. 3—Standard ATA DMA Protocol Timings
FIG. 4 Bus Extension Hardware
1 Signal Buffers and Drivers at Host
2 Extended bus conductor
3 Signal Buffers and Drivers at Device
FIG. 5a—ATA PIO Protocol At the Host (Extended Cable)
FIG. 5b—ATA PIO Protocol At the Device (Extended Cable)
FIG. 6 Effects of Extending the AT Bus on DMA Writes
FIG. 7—Effects of Extending the AT Bus on DMA Reads
FIG. 8 Reflective Timing Hardware Configuration
1 RT)—Reflective Timing Out from the Host
2 Buffer/Driver at Host
3 RTO Conductor
4 Receiver at Device
5 RTO signal Reflected as RTI
6 Buffer/Driver at Device
7 RTI Conductor
8 Receiver at Host
9 RTI signal at Host
FIG. 9 Extended Cable Configuration:
Cable Extend Host—This is the electronics, line drivers and logic required at the Host end of the extended cable. This might be a separate unit plugged into a standard Host or it might be directly built into the Host's electronics.
Cable Extend Device—This is the electronics, line drivers and logic required at the Device end of the cable. This might be a separate unit plugged into a standard Device or it might be directly built into the Device's electronics.
Cables (C1 and C3)—If the Host and/or Target Extenders are connected by a cable or connector, their combined length shall be no more than the maximum cable length specified by the bus standard. Thus, the maximum combined length of C1 and C3 is the same as the maximum length of C in FIG. 1. If a second Device is added to the cable, it will be on C3 between CED and the Device illustrated.
Cable C2—This is the extended cable. Its maximum length will be defined by the maximum period that the system can wait for a response or by electrical considerations.

FIG. 2 illustrates the ATA timing elements important to this explanation. The solid lines indicate the signal states over time, if the Device does not pause the Host to extend the protocol time. The dashed lines indicate the extended time due to the Device pausing the Host.

The protocol cycle can be considered to start at time $t_o$. At this point, the Host uses the Address signals on the bus to indicate which register in the Device is to be accessed. The elapsed period $T_a$ is the time window the Device has to recognize the address. At time $t_1$ the Host asserts either the Read or Write control signal to indicate to the Device the direction in which the data will flow.

The Device now has to prepare to send/receive the data. If the Device needs to extend the time required for this to happen, it must do so by negating the IORDY signal. The Host monitors IORDY for a period Tb until time $t_2$. If IORDY is negated before $t_2$ the Host will wait for IORDY (period Tc) to be released before continuing with the protocol. If IORDY is negated after $t_2$ the Host will ignore the negation and will not pause.

At some time before $t_4$, the data signals will be set to their correct values to indicate the data being transferred. The data signals are driven by the Host if data is being written to the Device, or driven by the Device if data is being read from it. At time $t_4$ the Host de-asserts the Read or Write signal and the data is read by either the Device or the Host, depending on the direction of transfer. Time $t_4$ is a period Td after $t_1$ where Td is the longer of a specified time that is defined in the ATA standard or the sum of the periods Tb and Tc. The period $t_e$ is the time required for both the Device and the Host to prepare for the start of the next protocol cycle.

DMA

Figure 3:
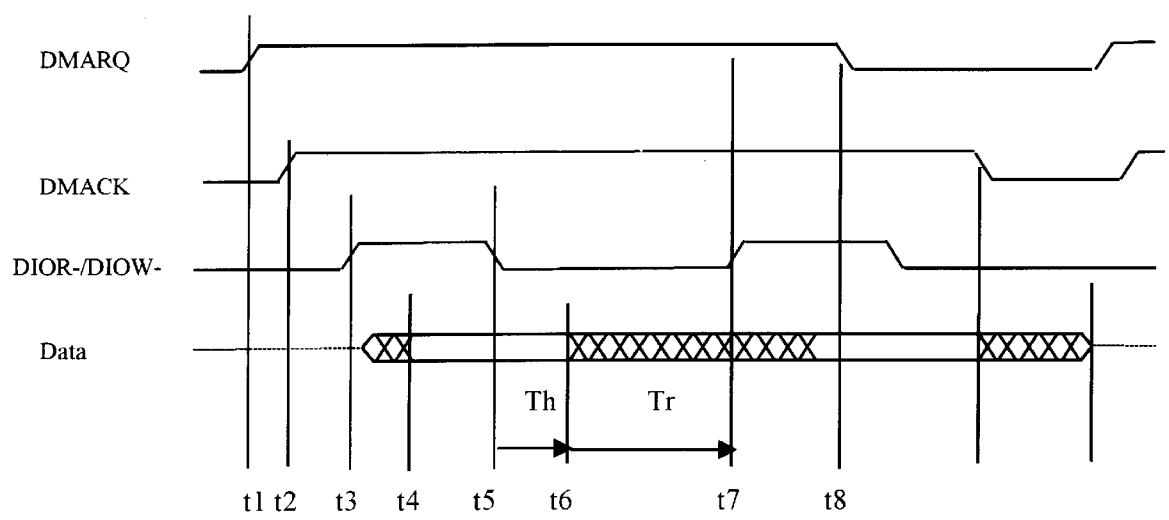

The ATA Multiword DMA protocol uses the ATA Asynchronous protocol for the Host to deliver the commands to the Device. The data transfer sequence is illustrated in FIG. 3. The sequence is initiated at time t1 by the Device asserting DMARQ to indicate that it is ready to begin a transfer. The Host at some time later t2 will assert DMACK to indicate that transfer cycles are commencing. The Host uses the DIOR and DIOW signals to control normal data transfer cycles. The DIOR signal is used if data is being read from the device, DIOW is used if data is being sent to the device. For the purposes of this explanation the signal will be called DIO. At time t3 the Host asserts DIO and the sender of the data sets the data signals on the bus so that the data will be stable by time t4. At time t5 the Host negates DIO and the reader of the data uses this transition to clock that data from the bus into its reading mechanism (registers). The sender of the data holds it valid for a hold period Th after t5 until time t6, this is the period that the receiver has to assimilate the data. After t6 the sender will release the bus and the data signals are no longer valid. The period Tr is the recovery period that the sender and receiver use to prepare for the next cycle to begin. If the Device wishes to pause the transfer it can do so at any time by de-asserting DMARQ. However the Host only samples DMARQ between time t7 and t8 during a cycle. If DMARQ is not de-asserted during this period the Host will perform one more clock cycle of DIO.

Ultra DMA

The Ultra DMA protocol is synchronous in both directions of transfer because the clock signal is transmitted from the sender to the receiver no matter if the sender is the Host or the Device. The protocol does allow the receiver to pause the sender by the de-assertion of a signal. The sender has a period defined in the ATA specification to stop the transmission of data, the receiver has to be able to accept more transitions after it has requested a pause to allow for propagation delays. The number of transitions that the receiver must be able to receive after requesting a pause is defined in the ATA specifications.

Lengthening the ATA Cable

Figure 4:
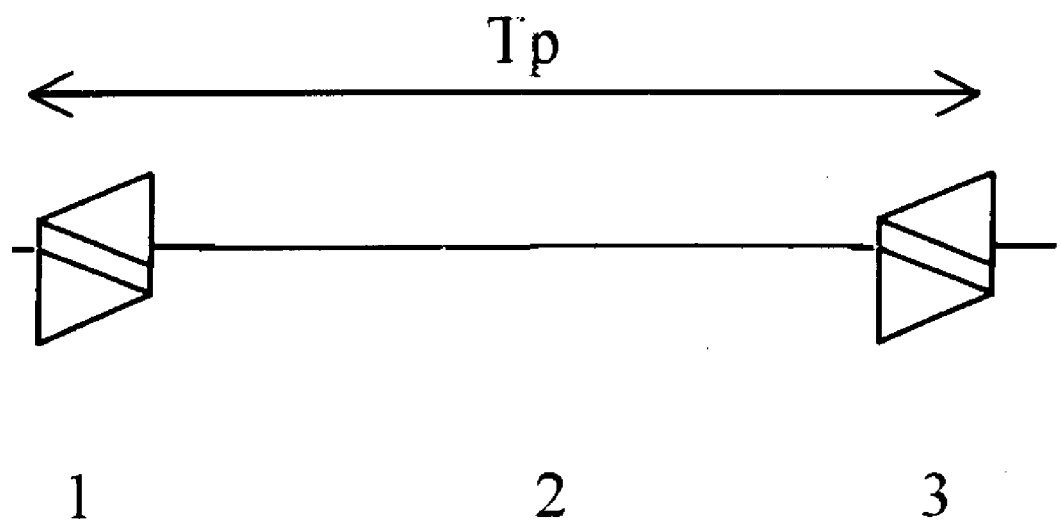

If the cable between the Host and the Device is lengthened, the signals will be delayed by the extra time it takes for a signal to traverse through the longer cable. It is likely that the signals will need to be buffered and terminated to provide adequate signal strength and reduce ringing inducing further propagation delays. FIG. 4 illustrates such an arrangement. The total propagation delay for a signal to traverse such a signal path is taken as period Tp. The effect of the propagation delay on the ATA asynchronous protocol is portrayed in FIGS. 5a and 5b. FIG. 5a represents the timings as seen by the Host and FIG. 5b as seen at the Device.

The Address signals are driven by the Host at time $t_0$. These signals propagate down the cable and through the buffers, arriving at the Device elapsed period $T_p$ later. A period Ta later the Read/Write signals are driven by the Host at time $t_1$ and arrive at the Device a period $T_p$ later. It is at this point that the Device has all the information it needs to decide which of its registers is being addressed and in which direction the data is to be sent. It is also at this point that the Device might need to negate IORDY to pause the Host. In practice such determination will take the Device a period Ti to negate IORDY and the negation will be seen by the Host elapsed a period $T_p$ later. This means that the negation of IORDY will not arrive at the Host until the combined round-trip propagation delay of $(T_p+T_i+T_p)$. The Host will only wait period $T_b$ to detect the negation of IORDY. If $(T_p+Ti+T_p)>T_b$, the negation of IORDY will be missed by the Host and data will be lost. Similarly, when data is being read by the Host, the Device will start to send it $T_p$ later than the time defined by the Host de-asserting the read/write signal. Thus, data will arrive at the Host delayed by a further time $T_p$, making a total delay of $(T_p+T_p)$ from the time when the Host is expecting it. Again, this can result in data loss.

Figure 6:
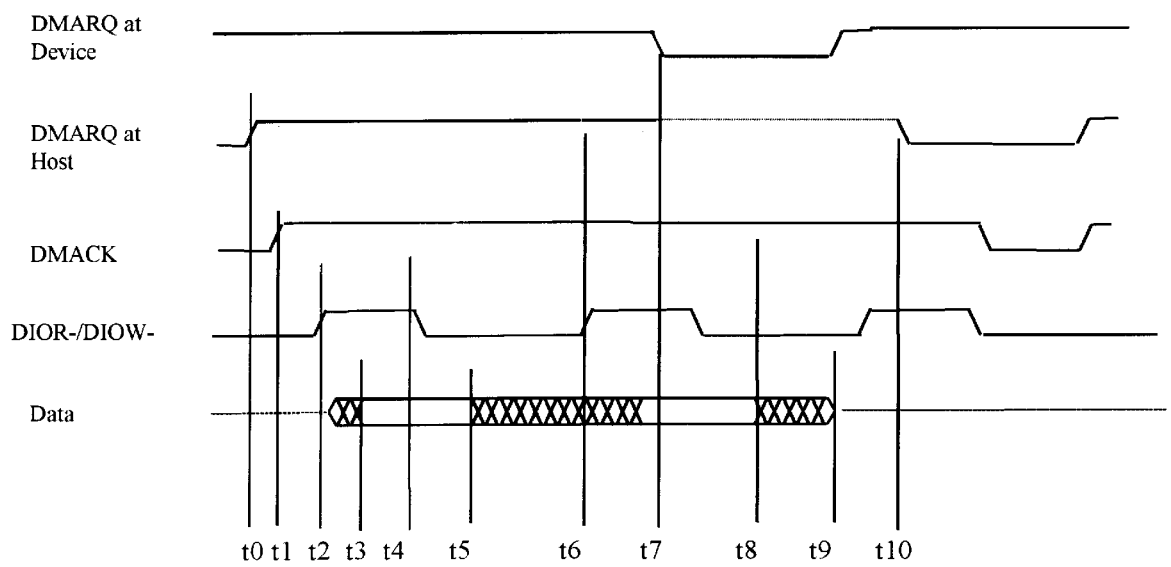
Figure 7:
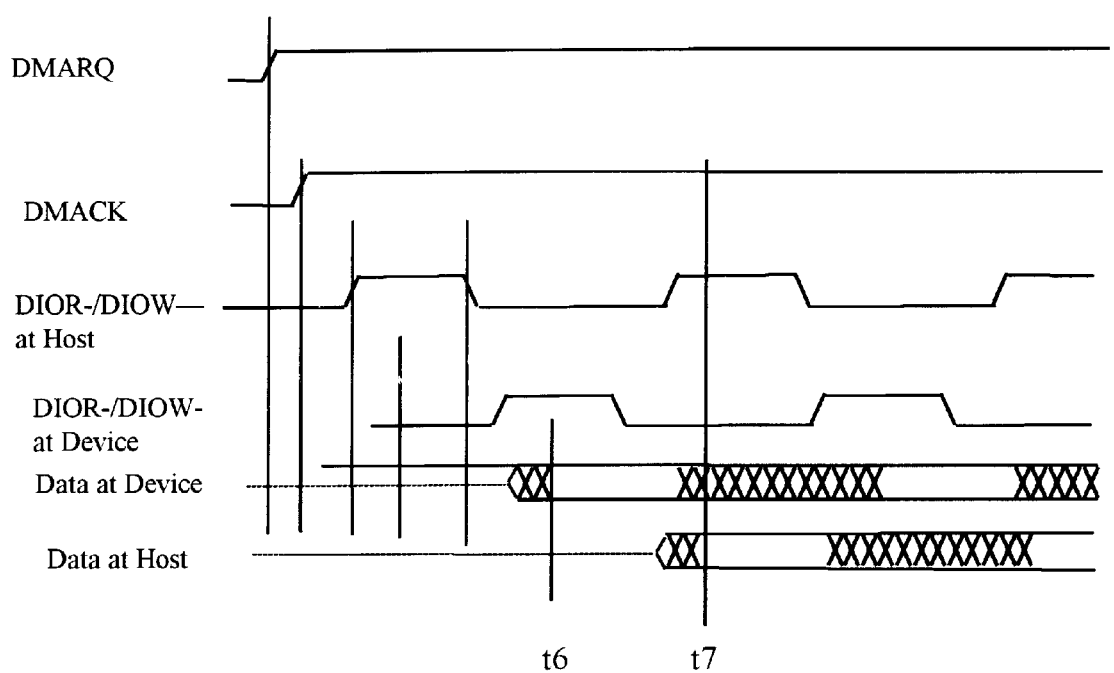

The effects of extending the cable on the DMA protocol are shown in FIGS. 6 and 7. FIG. 6 illustrates the use of the DMA protocol for sending data from the Host to the Device when using an extended bus. When data is being written to the Device the clock signal DIOW from the Host will be correctly aligned to the clock signal when they arrive at the Device. However, if the Device wishes to pause the Host, it will de-assert DMARQ relative to the DIOW signal at the Device's interface. The DIOW signal will arrive at the Device a period Tp later than the Host transmitted it. The de-assertion will then travel back to the Host and be seen by it Tp later than the Device de-asserted the signal. Thus if the de-assertion is not seen by the Host at time t10 instead of t7 (FIG. 6) the host will transmit at least one more clock cycle that the Device is expecting and may not be able to accept. The result is a loss of data.

FIG. 7 illustrates the case when data is being read from the Device to the Host. The Host will perform the same sequence of events as in FIG. 6 and sample the data lines at time t4. Because of the propagation period Tp, the Device will not start to set up the data signals on the bus until time t5. The data will be valid at the Device at time t6 but due to propagation delays will not be valid at the Host until time t7 which is a period Tp after t6. Thus the data will be valid at the Host a period (Tp+Tp) after the time the Host samples the data at time t4. The Host has no way of knowing that the data it has sampled is not valid and data errors and corruption will occur.

Use of Reflective Timing

Figure 8:
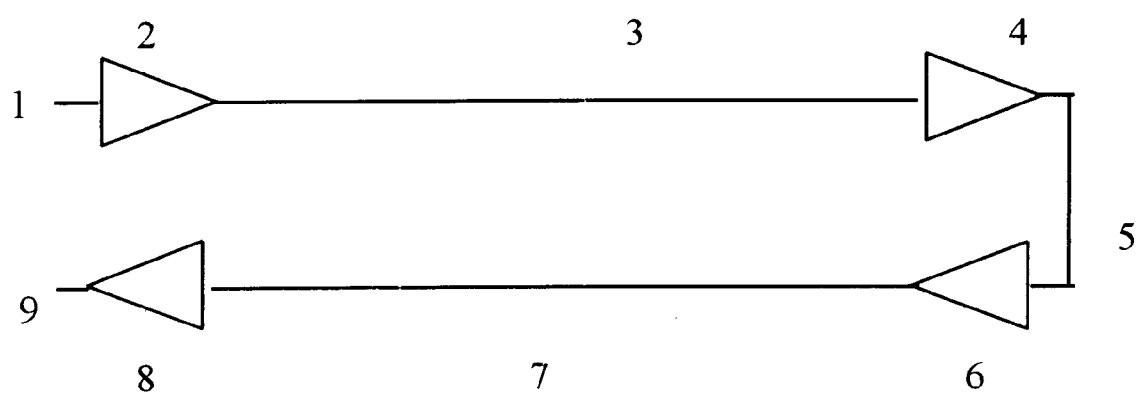

The propagation delay can be eliminated by using the reflective timing signals. In this implementation, the control of the protocols is from the Host. Consequently, the reflective signal will always be initiated at the Host. The two signals can be called Reflective Signal Host-to-Device (RSHD) and Reflective Signal Device-to-Host (RSDH). FIG. 8 illustrates the two wire implementation of the reflective timing signal.

An Implementation

The following discussion outlines one method of using the reflective timing principle. It is not intended to be the only method of implementation.

Figure 9:
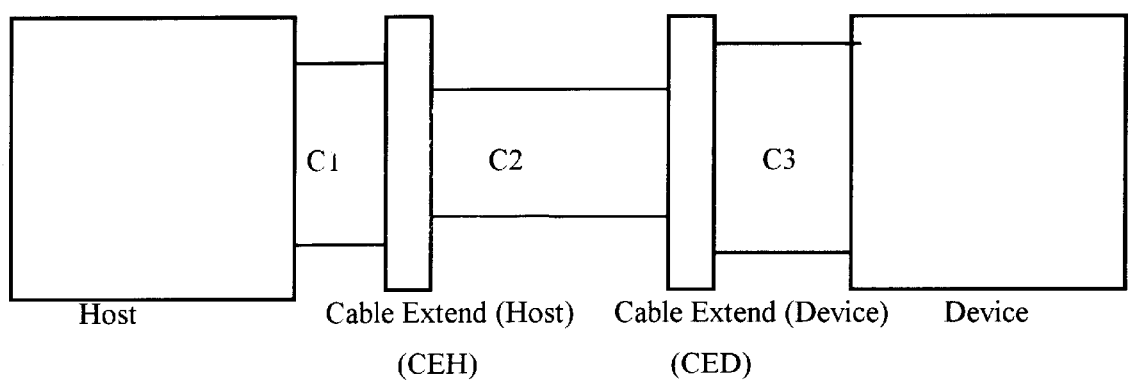

FIG. 9 is a block diagram of the elements of this implementation of the solution.

The propagation delay ($T_p$) is determined by the characteristics of the buffers in CEH, CED and the cable's electrical characteristics and length.

The signals transmitted by the cables are those defined by the ATA standard, as well as those required to implement the reflective timing solution. It is assumed that the ATA signals are buffered in CEH and CED.

The ATA PIO protocol solution uses a combination of the IORDY, Read/Write signals, RSHD and RSDH.

RSHD is generated and controlled in CEH, as described below. RSHD passes along a conductor in C2 and through CED. At the output of CED, it is turned back and becomes the input to RSDH at CED. RSDH then passes back through CED and a conductor in C2 to arrive at CEH. The time taken to travel from the input of CEH to the output of CED is $T_p$, the propagation delay. For the purposes of this description, the period taken to flow in the opposite direction is also $T_p$.

IORDY is generated by the Device and passes through a conductor in C3, through CED and through a conductor in C2. It does not pass straight through CEH. CEH modifies the timing of IORDY as described below. CEH generates a modified IORDY and passes it through a conductor in C1 to the Host.

When no transfer is in progress, CEH will hold RSHD low and see its reflection on RSDH. By effecting a logical OR function between RSDH and IORDY, IORDY will be held low. IORDY is not passed from CEH to the Host at this time.

The Host initiates the transfer sequence by generating a Read or Write signal. This signal passes through a conductor in C1 to CEH. CEH performs three tasks at the same time. The first is to pass the Read or Write signal to the Device via C2, CED and C3. The second is to send the modified state of IORDY through C2 to the Host. The IORDY sent to the Host (IORDY-Host) is effectively the logical OR of RTDH and the IORDY signal from the Device (IORDY-Device). As a result IORDY-Host will be low and will immediately signal a pause to the Host. The third action is to start some form of timer or use a delay circuit, with the objective of releasing RSHD after period $T_b$.

The Read or Write signal will propagate through CEH, C2 and CED in period $T_p$. The transition of RSHD from low to high will arrive at the output of CED an elapsed period $T_b$ after the Read or Write signal. At the output of CED, RSHD is tied to the input of RSDH. The signal transition will then start to propagate back to CEH, via RSDH. On arriving at CEH, the effect of RSDH going high would cause CEH to release the IORDY signal to the Host. The pause period would cease and the protocol would continue. The Read/Write signal's hold period would have been increased by $T_p$, allowing the data to be ready when the Read/Write signal changes state.

When the Read/Write signal changes state, CEH will isolate IORDY from the Host and will lower RSHD to prepare for the next protocol sequence.

If the Device wishes to lower IORDY, it has to do so in a time window $T_b$, measured from the time when the Read/Write signal arrived at CED. The IORDY-Device signal will travel through CED and C2 to CEH at the same time as, or before, the reflected high transition on RSDH travels back to CEH on RSDH. Because the IORDY-Host is the logical OR of IORDY-Device and RSDH, IORDY-Host will remain low and the pause will be extended by the delay period requested by the Device.

If the function of CEH is built into the Host, the implementation would differ. In such an implementation the Host would transmit RSHD at the same time as the Read or Write signal. The Host would then start its timing sequences from the arrival of RSDH instead of from the generation of the Read or Write signal.

If the DMA protocol is used to write data on an extended bus with extra propagation delays, the data will remain in proper timing relationship to the control signals at both ends of the bus. However a request from the device to pause the next transmission would be received by the Host too late to stop the next transmission of data. The device would not be in a state to receive the data that the host had already committed to sending. The result would be an undetected data loss. Similarly when the DMA protocol is being used to read data, the propagation delays will cause the data to arrive at the Host after the period that the Host is expecting to read it.

To overcome this reflective timing can be used to extend the period that the Host waits to monitor the DMARQ signal. The Host DMA process can provide the extra time period by using the signals RSHD and RSDH. One method is to stretch the period that the Read or Write signal is valid by the total round-trip propagation delay. The Host DMA process normally sets the Read or Write signal and then waits a defined period of time ($t_{c\text{-}valid}$) before clearing the signal. This period ($t_{c\text{-}valid}$) is generated by some form of timer. To generate the delay, the Host simultaneously sets the Read/Write signal and RSHD. It then waits to start its $t_{c\text{-}valid}$ timer until RSDH becomes valid due to the return of the signal sent on RSHD. The valid period would be stretched by the extra propagation delay. Consequently, any negation of DMARQ from the Device will arrive at the host in a proper relationship to the clock sequence. The Device can then pause the transmission of data without any data loss. Thus the timing delay would be proportional to the delays imposed by the circuits imposed and the length of the cable. The timing adjustment is entirely automatic and needs no user input.

ATA Ultra DMA

Like the DMA protocol, Ultra DMA uses the PIO protocol to initiate and terminate the data transfer. The transfer of the data is controlled by a clock signal. In this case, the clock is always generated by the sender of the data and thus remains in synchronization. There is a process for either end to pause or prematurely terminate the transfer. This is a handshake process and, although there are certain time constraints, these time windows are long in nature. These constraints are defined by the size of the receivers buffer. Because it is a synchronous protocol with a separate clock signal, one signal transition (set of data) may not have arrived at the receiver before the sender initiates the next transfer. Thus if the receiver sends a pause signal to the sender it must expect one or more sets of data to arrive from the sender. How many it can accept depends on the size of the receivers input buffer thus the delays can be determined. The ATA standard requires that the host can interrogate the device using the PIO protocol to determine the Devices characteristics. One of these characteristics is the implied size of its input buffer. The Host will know its own buffer capabilities and can measure the reflective timing delay and adjust the frequency of the clock to compensate for the delay. The adjustments are thus automatic and do not need user intervention.

Summary, Ramifications and Scope

The method described allows asynchronous bus protocols to function irrespective of their length or the intrinsic timing characteristics of the physical devices used to implement them.

This method has application wherever a Host/Device asynchronous protocol is used where data reception is expected within set time limits.

What I claim is:

1. A method for a Host on a physically extended ATA bus to use the ATA protocols to send and receive data to and from a Device on said bus by:

a) adding a signal wire to said bus to transmit a signal from the Host to the remote end of said bus, said signal to travel through similar circuits to the other signals on said bus to have a substantially similar propagation period, and b) for the remote end of said bus to reflect back said signal through said bus on another signal wire through a similar circuits to the other signals that travel from the remote end to the Host to have a substantially similar propagation period, and c) a means for the Host to add the delay measured by the period between transmitting said signal and receiving said reflected signal to the time that it samples data transmitted from the receiver, whereby the host will be able to reliably receive data sent from a receiving device independent of the length of the cable connecting them or the speed of the electrical buffers that might be used.

* * * * *